March 6, 1945. B. R. GRANBERG ET AL 2,371,045
FEED SCREW MECHANISM
Filed March 13, 1940
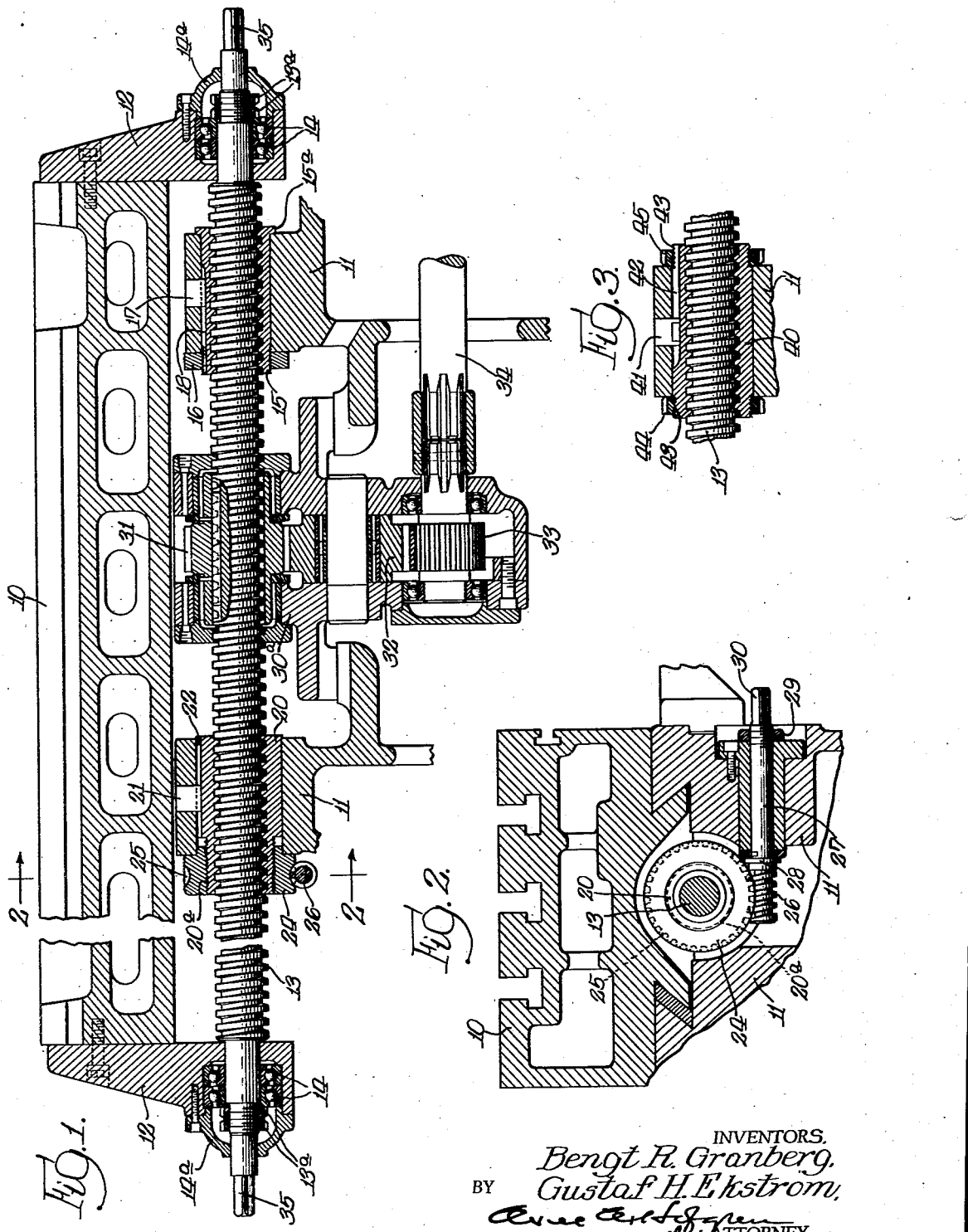
INVENTORS.
Bengt R. Granberg,
BY Gustaf H. Ekstrom,
ATTORNEY.

Patented Mar. 6, 1945

2,371,045

UNITED STATES PATENT OFFICE 2,371,045

FEED SCREW MECHANISM

Bengt R. Granberg and Gustaf H. Ekstrom, Rockford, Ill., assignors to Sundstrand Machine Tool Co., Rockford, Ill., a corporation of Illinois Application March 13, 1940, Serial No. 323,780

4 Claims. (Cl. 90—22)

This invention relates generally to improvements in feeding mechanism for machine tool supports or work tables, and more particularly to an improved screw and nut device in which lost motion or back-lash between the parts is effectively prevented.

It is the general object of the invention to provide a new and improved feed screw mechanism of the screw and nut type, which is simple in construction and efficient in operation, and which will effectively prevent lost motion between the parts during operation.

Another object of the invention is to provide an improved feed screw mechanism arranged to prevent lost motion during operation of the feed screw in either direction.

A further object is to provide a feed mechanism of the screw and nut type, in which the nut element includes two parts, both engaged with the screw element but relatively adjustable along the axis of the screw for taking up backlash or lost motion, and in which the surface of one of said elements is composed of a special material such as chromium plate, serving to minimize friction between the screw and nut elements, and insuring long, useful life therefor, so that means for effecting the adjustment may permissibly act with sufficient force to create a relatively high pressure between the threads of the respective elements.

Other objects and advantages will become apparent from the following description taken in connection with the acccmpanying drawing, in which:

Figure 1 is a vertical section taken through the base table of a milling machine at the axis of the feed screw, and illustrating a preferred form of the invention embodied therein.

Figure 2 is a transverse detail section taken as indicated at line 2—2 on Figure 1 to show the adjusting means for the take-up nut.

Figure 3 is a fragmentary detail section taken at the same plane as Figure 1 and showing a modified form of take-up nut.

While there is shown in the drawing, and described herein, a preferred form of this invention as embodied in a screw and nut feed mechanism for actuating the work table of a milling machine, it is to be understood that the invention is not limited to the specific form or application thus disclosed, and that we intend to cover all modifications and alternative constructions falling within the spirit and scope of the invention, as expressed in the appended claims.

As illustrated in the drawing, the table or work member 10 is slidably mounted for reciprocation on the base or supporting frame of the machine, of which fragmentary portions are seen at 11, and the table includes end brackets 12, 12 in which there is rotatably journaled a feed screw 13. The screw is shown carried on ball bearings 14 mounted in the brackets 12, said bearings being secured in the brackets in pre-loaded condition by means of end caps 14ª, and the screw being provided with clamping nuts 13ª which act against the inner races of the bearings to place the screw under a normal working tension. This prevents end play between the screw and table 10, and also subjects the screw to an initial elongation, thereby eliminating lost motion in the screw itself.

The base frame 11 supports a nut element 15 threaded to engage the screw 13 and formed with a flange 15ª at one end; its opposite end is threaded and provided with a clamping nut 16 by which the nut 15 is held fixed against axial movement in the frame 11. A key 17 engaging a groove 18 in the outer surface of the nut 15 locks it against rotation.

A second and supplemental nut 20, also threaded to fit the screw 13, is mounted in the base frame 11 engaging the screw at a distance from the nut 15. The nut 20 is held against rotation in the frame 11 by means of a key 21 engaging a groove 22 in its surface, but it is adjustable along the axis of the feed screw 13 for taking up lost motion or back-lash. One end of the nut 20 is of reduced diameter, and is formed with a relatively fine thread at 20ª. The adjusting nut 24, carried by the threads at 20ª, is formed as a worm gear with peripheral teeth 25 meshing with a worm 26 which is journaled in a portion of the base frame 11, as shown in Figure 2. The shaft 27 of the worm 26 includes a flange or collar 28 and a clamping nut 29 which may be employed to lock the worm against rotation when it has been operated by means of a suitable wrench or crank applied to the squared end 30 of the shaft 27. By means of the worm 26 and nut 24, the nut 20 may be slidably shifted along the axis of the feed screw 13 so as to take up any looseness or back-lash in the engagement of the threads of the screw 13 with those of the nut 15. Preferably, this adjustment of the nut 20 is in a direction away from the head or flange 15ª of the nut 15 so as to exert a tension on that portion of the feed screw between the nuts 15 and 20.

In the design illustrated the nuts 15 and 20 are mounted on the base 11 at opposite sides of a feed box 30ª within which there is rotatably mounted a gear 31 which has a splined connection with the feed screw 13. This gear meshes with a second gear 32 which, in turn, meshes with a driving gear 33 operated by a driving shaft 34 leading from any suitable power connection, not shown. Thus the rotation of the gear 31 turns the feed screw 13 and causes it to travel along its axis through the nuts 15 and 20, moving the table 10 upon the frame 11, and reverse rotation of the gear 31 will shift the table in the opposite direction. In addition, the ends of the screw shaft 13 are squared at 35 to receive a suitable wrench or crank for manual adjustment of the table, when desired.

Figure 3 shows a modified arrangement for the adjustable nut which is indicated in this view at 40, engaging the threads of the screw 13 in the same manner as the nut 20. The nut 40 is also anchored against rotation by means of a key 41 engaging a groove 42 in its outer surface. The nut 40 is formed with reduced and threaded portions 43 at both ends, with clamping nuts 44 and 45 applied respectively to these threaded end portions and engaging against opposite faces of the part of the base frame 11 in which the nut 40 is slidably mounted. Thus the nuts 44 and 45 may be adjusted to shift the nut 40 along the axis of the screw 13 for taking up lost motion or back-lash, and preventing end play of the screw 13 in the base frame 11. It will be evident that this modified construction may be a little cheaper to manufacture than that shown in Figures 1 and 2, but that in many instances it could not be made as conveniently accessible for adjustment.

Ordinarily, the tightening of the adjustable nut 20 (or the nut 40) to such an extent as to exert any considerable tension along the axis of the feed screw 13 in taking up the play or backlash in the threads thereof, would create excessive friction between the threads of the screw 13 and those of the nuts 15 and 20, which would impose a severe load upon the drive mechanism, and might either stall the operation of the machine or result in very rapid wear of the threaded elements of the feed mechanism. However, we have discovered that if the threads are chromium-plated the co-efficient of friction is so greatly reduced that a very considerable stress may be exerted against the threads by adjustment of the nut 20 (or the nut 40) without hampering operation of the machine, and without any rapid deterioration of the threaded members through wear. Preferably, the chromium-plating is applied to the surfaces of the feed screw 13, and the nuts 15 and 20 are made from a suitable quality of bearing bronze or other alloy, so that when these parts eventually become worn in service they can be economically replaced.

We claim as our invention:

1. In a machine tool which includes a base, a member mounted for reciprocation on said base, and a feed screw rotatably journaled on said member, the combination of a nut engaging the feed screw and secured fixedly to said base, and a second nut engaging the feed screw and secured positively in said base against rotation, the first nut having an integral transaxial shoulder bearing against a part of the base and the second nut having a threaded portion with finer threads than the feed screw and with an adjusting nut thereon, said adjusting nut having a transaxial surface facing toward said shoulder of the first nut and bearing against a part of the base whereby the second nut may be adjusted along the axis of the feed screw relatively to the first nut and in a direction to exert a tension on the screw, together with means positively locking said adjusting nut against rotation.

2. In a machine tool which includes a base, a member mounted for reciprocation on said base, and a feed screw rotatably journaled on said member, the combination of a nut engaging the feed screw and secured fixedly to said base, and a second nut engaging the feed screw and secured positively in said base against rotation, the first nut having an integral, transaxial shoulder bearing against a part of the base, and the second nut having a threaded portion with finer threads than the feed screw and with an adjusting nut thereon, said adjusting nut having a transaxial surface facing toward said shoulder of the first nut and bearing against a part of the base, together with gear teeth on the adjusting nut and a rotatably mounted worm meshing with said teeth for rotating the nut and locking it against rotation, whereby the second nut may be adjusted along the axis of the feed screw relatively to the first nut and in a direction to exert a tension on the screw.

3. In a machine tool which includes a base, a member mounted for reciprocation on said base, and a feed screw rotatably journaled on said member, the combination of a nut engaging the feed screw and secured fixedly to said base, and a second nut engaging the feed screw and secured positively in said base against rotation, the first nut having a transaxial shoulder bearing against a part of the base and the second nut having a threaded portion with an adjusting nut thereon, said adjusting nut having a transaxial surface facing toward said shoulder of the first nut and bearing against a part of the base whereby the second nut may be adjusted along the axis of the feed screw relatively to the first nut and in a direction to exert a tension on the screw.

4. In a machine tool which includes a base, a member mounted for reciprocation on said base, and a feed screw rotatably journaled on said member, the combination of a nut engaging the feed screw and secured fixedly to said base, and a second nut engaging the feed screw and secured positively in said base against rotation, the first nut having a transaxial shoulder bearing against a part of the base and the second nut having a threaded portion with an adjusting nut thereon, said adjusting nut having a transaxial surface facing toward said shoulder of the first nut and bearing against a part of the base, together with gear teeth on the adjusting nut and a rotatably mounted worm meshing with said teeth for rotating said nut, whereby the said second nut may be adjusted along the axis of the feed screw relatively to the first nut.

BENGT R. GRANBERG.
GUSTAF H. EKSTROM.